US011824731B2

(12) United States Patent
Tzoreff et al.

(10) Patent No.: US 11,824,731 B2
(45) Date of Patent: Nov. 21, 2023

(54) ALLOCATION OF PROCESSING RESOURCES TO PROCESSING NODES

(71) Applicant: salesforce.com, inc., San Francisco, CA (US)

(72) Inventors: Elad Tzoreff, Kochav Yair (IL); Rafi Dalla Torre, Givataim (IL)

(73) Assignee: Salesforce, Inc., San Francisco, CA (US)

( * ) Notice: Subject to any disclaimer, the term of this patent is extended or adjusted under 35 U.S.C. 154(b) by 28 days.

(21) Appl. No.: 17/564,440

(22) Filed: Dec. 29, 2021

(65) Prior Publication Data

US 2023/0208725 A1 Jun. 29, 2023

(51) Int. Cl.
*H04L 41/147* (2022.01)
*G06N 5/022* (2023.01)
*G06N 20/00* (2019.01)

(52) U.S. Cl.
CPC .......... *H04L 41/147* (2013.01); *G06N 5/022* (2013.01); *G06N 20/00* (2019.01); *G06F 2209/5019* (2013.01)

(58) Field of Classification Search
CPC ............ G06F 2209/5019; G06N 5/022; G06N 20/00; H04L 41/147
See application file for complete search history.

(56) References Cited

U.S. PATENT DOCUMENTS

| 7,639,674 | B2 * | 12/2009 | Yeh ......................... H04L 45/00 370/359 |
| 8,185,909 | B2 * | 5/2012 | Sigal ....................... G06F 9/505 706/14 |
| 10,425,340 | B2 * | 9/2019 | Avidar .................. G01C 15/004 |
| 10,489,215 | B1 * | 11/2019 | Wen .......................... G06F 9/50 |
| 2014/0229210 | A1 * | 8/2014 | Sharifian ............ G06Q 10/0631 705/7.29 |
| 2020/0034197 | A1 * | 1/2020 | Nagpal ..................... G06F 9/50 |
| 2022/0104213 | A1 * | 3/2022 | Song ................... H04W 72/121 |

* cited by examiner

Primary Examiner — Thomas J Dailey
(74) Attorney, Agent, or Firm — Butzel Long

(57) ABSTRACT

There is provided a computer implemented method of allocating processing resources for processing by processing nodes, comprising: training predictive models, each predictive model for a respective processing node, each predictive model trained on a training dataset comprising records, each record including a historical amount of processing resources allocated to the respective processing node and a ground truth label indicating historical processing outcomes, wherein each processing node exhibits diminishing returns of processing outcomes with increasing allocated processing resources, wherein each predictive model is implemented as a monotonically increasing function that reaches a saturation level, solving an optimization allocation problem using the predictive models to identify a respective amount of processing resources for allocation to each processing node that maximizes a total of processing outcomes for a predetermined total amount of processing resources, and generating instructions for allocation of the respective amount of processing resources to each respective processing node.

20 Claims, 10 Drawing Sheets

ALLOCATION OF PROCESSING RESOURCES TO PROCESSING NODES

BACKGROUND

Some embodiments relate to allocation of processing resources and, more specifically, but not exclusively, to systems and methods for optimal allocation of processing resources to processing nodes.

In a parallel processing system, adding additional processors to perform a parallel computation reduces overall time to process a program that can be parallel processed.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Figure 1:
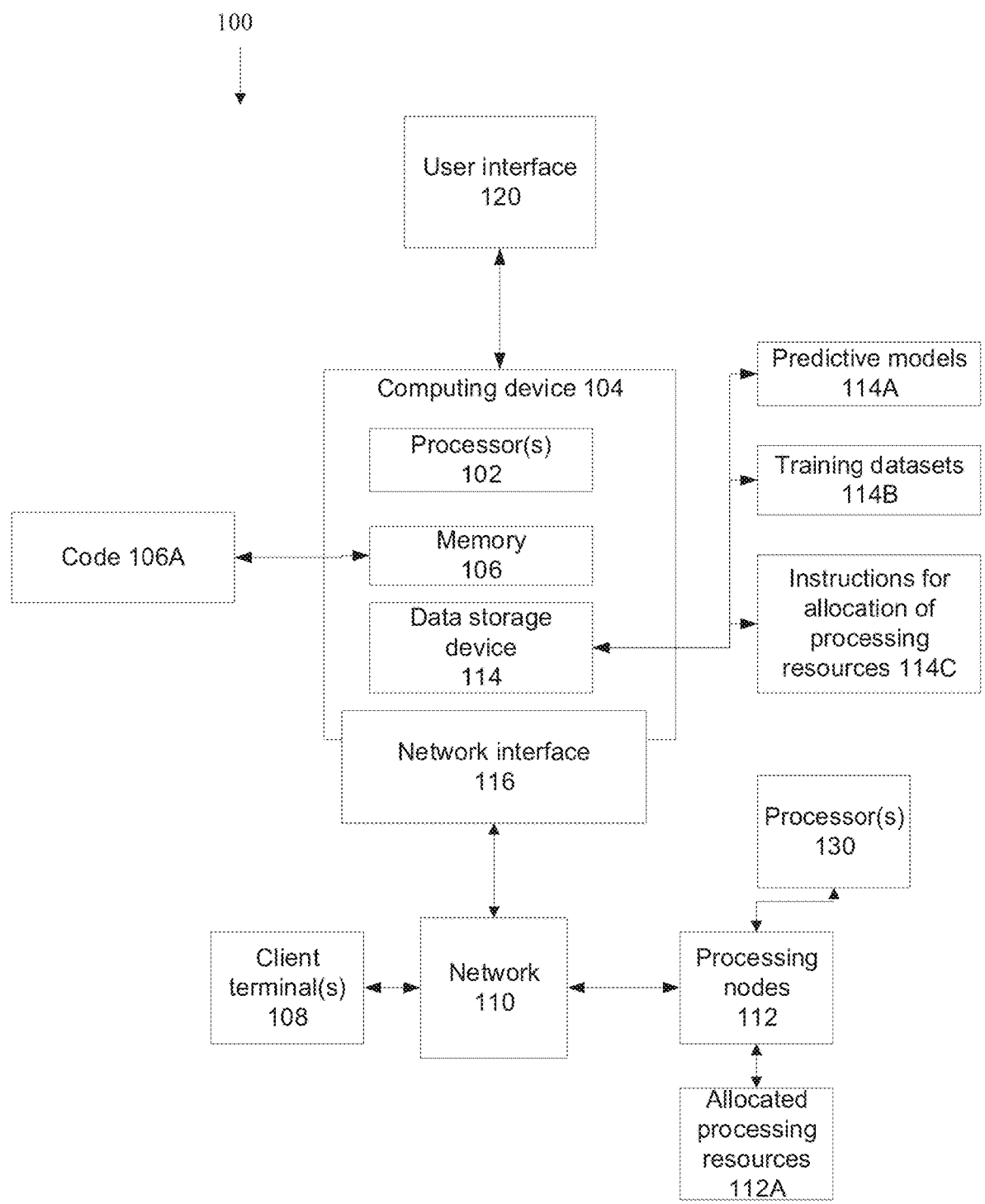
FIG. 1 is a block diagram of components of a system for allocating processing resources for processing by multiple processing nodes exhibiting diminishing returns of processing outcomes, in accordance with some embodiments.

Some embodiments relate to allocation of processing resources and, more specifically, but not exclusively, to systems and methods for optimal allocation of processing resources to processing nodes.

According to a first aspect, a computer implemented method of allocating processing resources for processing by a plurality of processing nodes, comprises: training a plurality of predictive models, each predictive model for a respective processing node, each predictive model trained on a training dataset comprising a plurality of records, each record including a historical amount of processing resources allocated to the respective processing node and a ground truth label indicating historical processing outcomes, wherein each processing node exhibits diminishing returns of processing outcomes with increasing allocated processing resources, wherein each predictive model is implemented as a monotonically increasing function that reaches a saturation level, solving an optimization allocation problem using the plurality of predictive models to identify a respective amount of processing resources for allocation to each processing node that maximizes a total of processing outcomes for a predetermined total amount of processing resources, and generating instructions for allocation of the respective amount of processing resources to each respective processing node.

According to a second aspect, a device for allocating processing resources for processing by a plurality of processing nodes, comprises: at least one processor executing a code for: training a plurality of predictive models, each predictive model for a respective processing node, each predictive model trained on a training dataset comprising a plurality of records, each record including a historical amount of processing resources allocated to the respective processing node and a ground truth label indicating historical processing outcomes, wherein each processing node exhibits diminishing returns of processing outcomes with increasing allocated processing resources, wherein each predictive model is implemented as a monotonically increasing function that reaches a saturation level, solving an optimization allocation problem using the plurality of predictive models to identify a respective amount of processing resources for allocation to each processing node that maximizes a total of processing outcomes for a predetermined total amount of processing resources, and generating instructions for allocation of the respective amount of processing resources to each respective processing node.

According to a third aspect, a non-transitory medium storing program instructions for allocating processing resources for processing by a plurality of processing nodes, which, when executed by a processor, cause the processor to: train a plurality of predictive models, each predictive model for a respective processing node, each predictive model trained on a training dataset comprising a plurality of records, each record including a historical amount of processing resources allocated to the respective processing node and a ground truth label indicating historical processing outcomes, wherein each processing node exhibits diminishing returns of processing outcomes with increasing allocated processing resources, wherein each predictive model is implemented as a monotonically increasing function that reaches a saturation level, solve an optimization allocation problem using the plurality of predictive models to identify a respective amount of processing resources for allocation to each processing node that maximizes a total of processing outcomes for a predetermined total amount of processing resources, and generate instructions for allocation of the respective amount of processing resources to each respective processing node.

In a further implementation form of the first, second, and third aspects, further comprising: for each training dataset: partitioning the plurality of records into buckets with internal minimal variance using a dynamic programming approach, and for each bucket, removing records that exceed a threshold.

In a further implementation form of the first, second, and third aspects, each predictive model is implemented as a concave piecewise linear model (CPWL) denoting a point-wise maximum of a set of affine functions, wherein parameters of the affine functions are determined by minimizing a mean square error on the plurality of records of the training dataset of the respective predictive model.

In a further implementation form of the first, second, and third aspects, solving the plurality of predictive models comprises solving a plurality of concave piecewise linear models to obtain a global maxima, wherein the plurality of concave piecewise linear models are rewritten in terms of an epigraph of a function where a maximum function is reformulated as a set of linear inequality constraints providing an augmentation of variables representing a maximal value that is reachable by each function.

In a further implementation form of the first, second, and third aspects, given at least one of: (i) a set of linear objective constraints, (ii) linear equality constrains, and (iii) inequality constraints, the plurality of concave piecewise linear models are solved using a linear programming solver.

In a further implementation form of the first, second, and third aspects, each predictive model is implemented as an isotonic model comprising a non-parametric model.

In a further implementation form of the first, second, and third aspects, training the isotonic model comprises finding a non-decreasing step-wise approximation of a function while minimizing a mean square error on the plurality of records of the training dataset of the respective predictive model.

In a further implementation form of the first, second, and third aspects, the plurality of records of the training dataset of the respective predictive model are used to find partitions to steps along an axis indicating the historical amount of processing resources and along an axis indicating the processing outcomes.

In a further implementation form of the first, second, and third aspects, solving the plurality of predictive models comprises solving a plurality of isotonic models as a mixed integer linear programming (MILP) problem, wherein the plurality of isotonic models are recast using indicator functions representing whether the processing resources allocated to a specific processing node falls within a certain bucket of the isotonic model or not.

In a further implementation form of the first, second, and third aspects, the plurality of isotonic models become a sum of indicator variables multiplied by a level of the certain bucket, wherein constraints of the processing resources for allocation are reformulated using the indicator functions, and wherein the indicator functions are Boolean, constrains are linear, and an objective function indicating maximization of the total processing outcome is linear.

In a further implementation form of the first, second, and third aspects, each predictive model is implemented as a sigmoid model comprising a plurality of parameters of a function that minimizes a mean square error on the plurality of records of the training dataset of the respective predictive model, wherein the sigmoid model is based on a scaled logistic function capable of achieving values that exceed a range of 1.

In a further implementation form of the first, second, and third aspects, training the sigmoid model comprises finding the plurality of parameters by constraining the plurality of parameters to obey a zero-crossing constraint.

In a further implementation form of the first, second, and third aspects, solving the plurality of predictive models comprises solving a plurality of sigmoid models based on an augmented Lagrangian approach.

In a further implementation form of the first, second, and third aspects, at least one of: (i) bound constraints including upper bounds and/or lower bounds per processing node are handled using projected gradient steps, and (ii) global constraints are handled using an augmented Lagrangian approach.

In a further implementation form of the first, second, and third aspects, further comprising: during the training the plurality of predictive models, estimating an uncertainty value indicative of a goodness of fit of the training dataset to the respective predictive model using a mean square error (MSE) metric on the records of the training dataset, dividing the records of the training dataset into a plurality of buckets with internal minimal variance of a prediction error using a dynamic programming approach, and computing a non-uniform uncertainty value for the plurality of buckets.

In a further implementation form of the first, second, and third aspects, further comprising computing a prediction of the total processing outcomes for the predetermined total amount of processing resources by feeding an indication of each respective amount of processing resources for allocation to each respective corresponding predictive model, obtaining an indication of a respective predicted processing outcome of the respective amount of processing resources for allocation to the respective corresponding processing node, and computing a sum of the amounts of processing outcomes for the amounts of processing resources by the plurality of processing nodes.

In a further implementation form of the first, second, and third aspects, at least one of: the predetermined total amount of processing resources is constrained by a global constraint, and the amount of processing resources for allocation to each respective processing node is constraint by a respective local constraint.

In a further implementation form of the first, second, and third aspects, the processing resources for allocation comprises content for allocation, the plurality of processing nodes comprises a plurality of content platform nodes, and the processing outcome for each respective content platform node is in response to an interaction of at least one user with the content allocated to the respective content platform node.

At least some embodiments of the systems, methods, computing devices, and/or code instructions (stored on a data storage device and executable by one or more hardware processors) allocate processing resources for processing by processing nodes that exhibit diminishing processing outcomes (i.e., decreasing marginal return) with increasing allocated processing resources. Multiple predictive models are trained, where each respective model is for a respective processing node. A respective predictive model is trained on a training dataset of multiple records. A record includes historical processing resources allocated to the respective processing node, and a ground truth label indicating historic processing outcomes (by the historical processing resources allocated to the respective processing node). Each predictive model is implemented as a monotonically increasing function that reaches a saturation level, for example, a sigmoid model and a concave piecewise linear (CPWL) model.

Optionally, the predictive model is implemented as a stepwise monotonically increasing function, for example, an isotonic model. The predictive models may be trained by computing a fitted curve to data points of the training dataset, where the curve is according to a selected type of predictive model. An optimization allocation problem is solved using the predictive models, by identifying a respective amount of processing resources for allocation to each processing node, predicted to maximize total processing outcomes by all processing nodes. Instructions for allocation of the respective amount of processing resources to each respective processing node are generated. The respective amount of processing resources may be allocated to each respective processing node according to the generated instructions.

The processing resources may be resources that perform processing at the node, and/or resources which are processed by the node. Examples of processing resources include: hardware processors, virtual processors, hardware memory, virtual memory, processes that execute tasks, code, and content.

The processing outcomes are results of the processing resources of the node performing the processing, for example, amount of images/text processed, amount of computations performed, amount of processed code, number of processed packets, amount of content presented on displays, number of clicks by users.

The objective may be to maximize the processing outcomes. In some cases, the maximizing of the processing outcome may be reflected in a minimizing of another outcome, for example, maximizing number of packets processed minimizes the amount of time taken to process the packets.

The processing nodes may include one or a group of hardware processors, which may be in addition to the allocated processing resources, and/or may include the allocated processing resources. The hardware processors may be, for example, distributed among network nodes, multiple cores of a multi-core processor, and/or multiple processors that are locally connected. The processing outcome by each processing node may include, for example, minimizing the total amount of time taken to complete processing by the respective processor(s), utilization of the processor(s) during processing of the respective code, and the like. Embodiments described herein may be used to determine how to allocate processing resources amongst available hardware processors for improving performance of the executing programs, such as reduced delays.

In yet another example, the processing resources for allocation is network traffic (e.g., packets). The processing nodes may be implemented as network devices that process the packets (e.g., router, bridge, firewall). The processing outcomes to maximize may include, for example, number of packets processed. Embodiments described herein may be used to determine how to allocate traffic amongst the network devices to improve network performance, such as reduced delays and/or increased bandwidth due to the maximization of processing of packets.

In another example, the processing resources for allocation includes content for allocation, for example, images, videos, text, graphic animation, optionally as part of advertisements, and the like. The processing node may be implemented as content platform nodes (e.g., channels), for example, content publishers, social media sites, news channels, video channels, search engines, and the like. The processing outcomes by each respective content platform channel may be in response to an interaction of user(s) with the content allocated to the respective content platform channel, for example, clicks made by users on links associated with the presented content. The total amount of content to be allocated may be constrained, for example, by an advertising budget. Embodiments described herein may be used to determine the amount of advertisements to allocate to each content platform node (e.g., channel) to maximize the total desired processing outcome (e.g., clicks made by users). The amount of advertisements to allocate may be constrained by an advertising budget.

At least some implementations described herein provide a technical solution to the technical problem of optimizing allocation of processing resources to processing nodes that exhibit diminishing returns of processing outcomes, with increasing amounts of allocated processing resources. The technical problem relates to how to allocate the processing resources between the nodes, and/or of all of the nodes together. The law of diminishing returns states that every additional unit of production factor will result in a smaller increase in output. For a certain processing node that exhibits diminishing returns, the more processing resources that is allocated to that processing node, the smaller the improvement in the processing outcome by the processing node. A saturation level may be reached in which no additional improvement is seen (and/or a decrease in improvement may be reached). The technical problem addressed by at least some embodiments described herein, is for the case when the processing nodes and/or processing resources are different, displaying a different diminishing return profile, and the total processing outcome of all the processing nodes and/or processing resources is to be maximized. For example, the same type of processing resources may display a different diminishing return profile when allocated to different nodes. The challenge for such a case is how to allocate the processing resources to all the nodes together in an optimal way. Finding the solution is technically challenging, since the optimization cannot be performed per each node separately for the case of predictive models implemented as monotonically increasing functions. The simple solution of finding one node, and allocating all processing resources to that node, is clearly unsuitable.

At least some implementations described herein improve upon previous approaches to handling processing nodes that exhibit diminishing returns of processing outcomes. For example, In computer architecture, Amdahl's law is a formula which gives the theoretical speedup in latency of the execution of a task at fixed workload that can be expected of a system whose resources are improved. Amdahl's law is often used in parallel computing to predict the theoretical speedup when using multiple processors. However, Amdahl's law only describes the performance of a single node with multiple processors, to help determine the optimal number of processors to allocate to the node. Amdahl's law does not provide an approach to selecting the optimal number of processors to allocate to the node, since increasing the number of processors increases the processing outcome, even marginally. Therefore the simple solution following Amdahl's law is to allocate all processors to the node. Amdahl's law does not address the optimization problem of resource allocation between multiple nodes for maximizing the total processing outcomes from the multiple nodes. In contrast, at least some embodiments described herein provide an approach to solving the optimization problem of resource allocation between multiple nodes for maximizing the total processing outcomes from the multiple nodes.

At least some implementations described herein address the above mentioned technical problem, and/or improve the technical field of allocation of processing resources to processing nodes (e.g., parallel computing) and/or improve over existing approaches. The improvement provided by at least some embodiments described herein is in the ability to determine how to optimally divide and allocate a predetermined total amount of processing resources amongst multiple different processing nodes with different diminishing return profiles, to maximize processing outcomes by the multiple processing nodes on the amount of processing resources. The multiple processing nodes may be of any type, of different types, and may not necessarily be related (i.e., there may be a correlation between processing nodes, or there may be no correlation between processing nodes). The solution and/or improvement is based on training multiple predictive models, where each respective predictive model corresponds to a respective processing node. Different processing nodes may exhibit different diminishing processing returns of processing outcomes with increasing amount of allocated processing resources. Each predictive model is implemented as a monotonically increasing, optionally step-wise monotonically increasing, function that reaches a saturation level. The optimization problem using the predictive models is solved. The respective amount of processing resources for allocation to each processing node for maximizing the total processing outcomes of the predetermined total amount of processing resources is determined from the solution. The respective amount of processing resources of the predetermined total amount of processing resources is allocated to each respective processing node.

At least some implementations described herein improve computational efficiency of a computing device that computes the allocation of processing resources to respective processing nodes. Computational efficiency may be improved, for example, in terms of reduced utilization of processing resources (e.g., processors), reduced memory usages, and/or reduced processing time. The improvement in computational efficiency may be obtained, for example, by the approaches described herein for solving a set of trained predictive models. The improvement in computational efficiency may be in comparison to other approaches, which may be computationally less efficiency, for example, requiring higher utilization of processing resources (e.g., processors), higher memory usages, and/or increased processing time.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Figure 2:
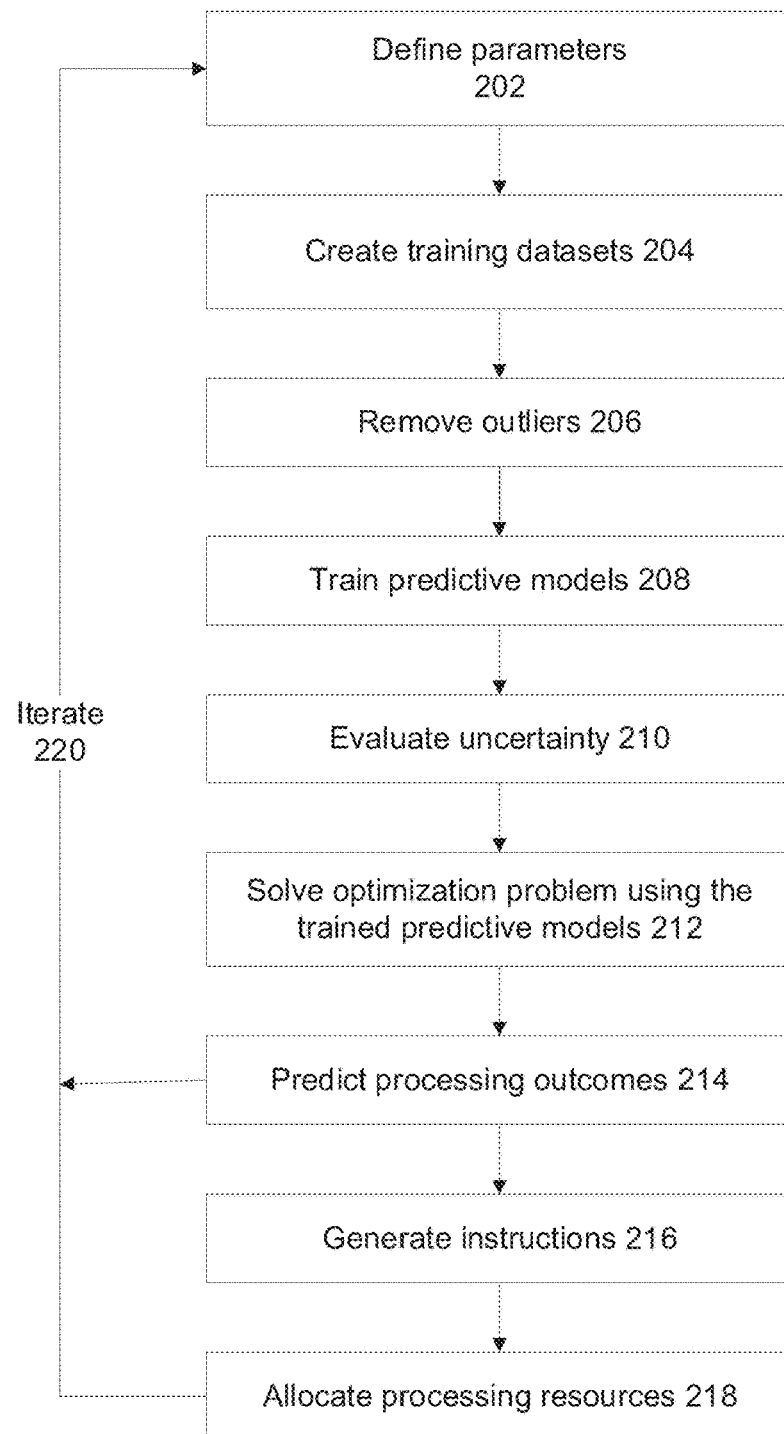
FIG. 2 is a flowchart of a method of allocating processing resources for processing by multiple processing nodes exhibiting diminishing returns of processing outcomes, in accordance with some embodiments.
Figure 3:
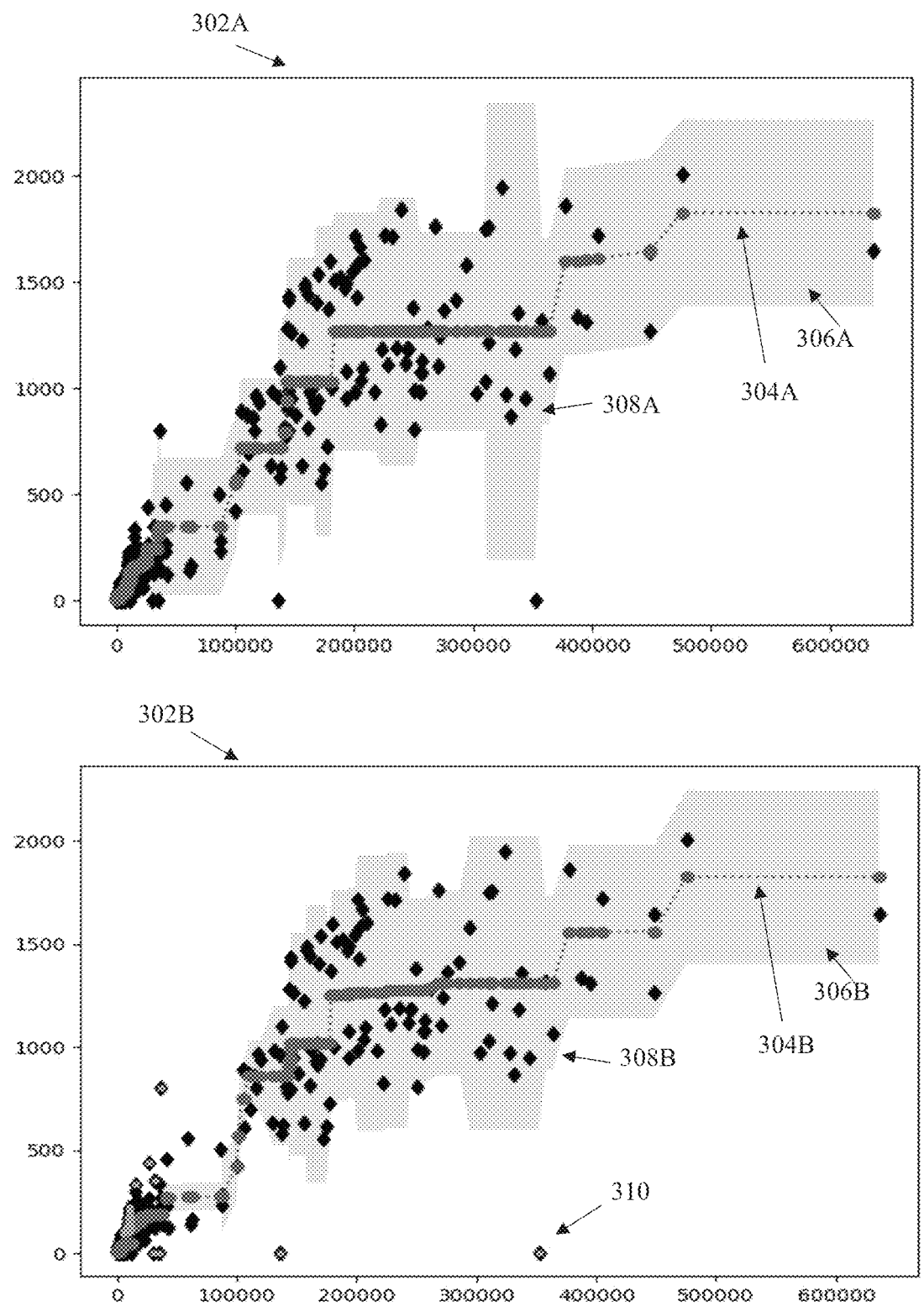
FIG. 3 is a graph depicting a prediction model and error boundary fitted to points of records of a training dataset without outlier removal and another graph depicting a prediction model and error boundary fitted to points of the records with identified outliers that were removed, in accordance with some embodiments.

Reference is now made to FIG. 1, which is a block diagram of components of a system 100 for allocating processing resources for processing by multiple processing nodes exhibiting diminishing returns of processing outcomes, in accordance with some embodiments. Reference is also made to FIG. 2, which is a flowchart of a method of allocating processing resources for processing by multiple processing nodes exhibiting diminishing returns of processing outcomes, in accordance with some embodiments. System 100 may implement the acts of the method described with reference to FIGS. 2-10, by processor(s) 102 of a computing device 104 executing code instructions stored in a memory 106 (also referred to as a program store).

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

A centralized architecture. Computing device 104 executing stored code instructions 106A, may be implemented as one or more servers (e.g., network server, web server, a computing cloud, a virtual server) that provides centralized services (e.g., one or more of the acts described with reference to FIGS. 2-10) to one or more client terminals 108 over a network 110. For example, providing software as a service (SaaS) to the client terminal(s) 108, providing software services accessible using a software interface (e.g., application programming interface (API), software development kit (SDK)), providing an application for local download to the client terminal(s) 108, providing an add-on to a web browser running on client terminal(s) 108, and/or providing functions using a remote access session to the client terminals 108, such as through a web browser executed by client terminal 108 accessing a web sited hosted by computing device 104. For example, each client terminal 108 provides one or more data of training datasets 114B to computing device 104. Client terminal 108 may collect the multiple training datasets 114B from multiple processing nodes 112, as described herein. Each processing node 112 includes one or more processors 130, which may include, and/or may be used in conjunction with, allocated processing resources 112A. Computing device 104 may train the predictive models 114A, and solve the optimization allocation problem using predictive models 114A. Computing device 104 may provide an indication of allocation of an amount of processing resources 112A to each processing node 112, for example as instructions for allocation of processing resources 114C, to the corresponding client terminal 108. Each client terminal 108 may generate their own respective instructions for allocation of the amount of processing resources 112A to each processing node 112, and/or perform the allocation. Alternatively or additionally, computing device 104 sends the instructions for allocation of processing resources 114C to nodes 112 through network interface 116. Each processing node 112 is allocated the amount of processing resources according to the indication generated by computing device 104. Each processing node 112 may send a feedback message to computing device 104 indicating the actual processing outcomes. The feedback may be used to update training datasets 114B, using the actual allocated processing resources and a ground truth of the actual processing outcomes. Predictive models 114A may be updated using the updated training datasets 114B for improving subsequent processing resources allocation. The centralized architecture may improve utilization of processing resources in performing computationally intensive operations, such as training the predictive models 114A and/or solving the predictive models 114A, in particular for multiple client terminals 108.

A local architecture. Computing device 104 may be implemented as a standalone device (e.g., kiosk, client terminal, smartphone) that include locally stored code instructions 106A that implement one or more of the acts described with reference to FIGS. 2-10. For example, computing device 104 may collect data for the multiple training datasets 114B from multiple processing nodes 112, as described herein. Computing device 104 may train the predictive models 114A, and solve the optimized allocation problem using trained predictive models 114A. Computing device 104 may generate the instructions for allocation of the amount of processing resources 112A to each processing 112, and/or perform the allocation.

A combined local-central architecture. Computing device 104 may be implemented as a server that includes code instructions 106A for centrally implementing one or more of the acts described with reference to FIGS. 2-10, while other acts described with reference to FIGS. 2-10 are handled by respective client terminals 108 that access computing device 104. For example, each client terminal 108 trains its own set of predictive models 114A, and provides the trained predictive models 114A to computing device 104. Computing device 104 centrally solves the optimized allocation problem using trained predictive models 114A, and provides the indication of allocation of the amount of processing resources 112A to each processing node 112, to the corresponding client terminal 108. Each client terminal 108 may generate their own respective instructions for allocation of the amount of processing resources 112A to each processing node 112, and/or perform the allocation.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-10 when executed by hardware processor(s) 102.

Computing device 104 may include a data storage device 114 for storing data, for example, predictive models 114A (e.g., trained and/or untrained), training datasets 114B used for training predictive models 114A, and instructions for allocation of processing resources to processing nodes 114C, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 116 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 includes and/or is in communication with one or more physical user interfaces 120 that include a mechanism for a user to enter data (e.g., manually select the implementation of the predictive models) and/or view the displayed results (e.g., allocation of amount of processing resources to each processing node, processing outcomes). Exemplary user interfaces 120 include, for example, one or more of, a touchscreen, a display, a virtual reality display (e.g., headset), gesture activation devices, a keyboard, a mouse, and voice activated software using speakers and microphone.

Exemplary processing nodes 112 and exemplary allocated processing resources 112A have been described above.

Referring now back to FIG. 2, at 202, one or more parameters are selected. The parameters may be, for example, predefined, randomly selected, selected by a user (e.g., via a user interface), sequentially selected, selected based on a trial and error approach to determine which parameter(s) provides the best outcome, and/or selected based on a computation that determines which parameter provides the best outcome(s).

Exemplary parameters include:

The type of prediction model, for example, selected from the different types described herein. Different types of predictive models may be evaluated on the training dataset. The type of prediction model that best suits the records of the training dataset may be selected. The type of prediction model may be selected, for example, by the user based on the user's knowledge, and/or automatically such as according to the type of prediction model that has a best goodness of fit to the records of the training dataset.

Upper bounds and/or lower bounds per processing node. For example, bounds on the amount of processing resources for allocation to each respective processing node.

Global constraints. For example, defining the predetermined total amount of processing resources which are divided and allocated to the processing nodes. For example, a fixed value, or a range.

Processing outcomes per processing node. For example, number of user interactions in response to allocated content per processing node.

Definition of the total amount of processing outcome that is maximized. For example, sum of processing outcomes of all the processing nodes which were allocated processing resources.

At 204, multiple training datasets are created. Each training dataset is created based on data associated with a respective processing node exhibiting diminishing returns of processing outcomes with increasing allocated processing resources. Different processing nodes may exhibit different diminishing returns of processing outcomes with increasing allocated processing resources. Each training dataset includes multiple records. Each record includes historical processing resources allocated to the respective processing node and a corresponding ground truth label indicating processing outcome (i.e., for the corresponding historical amount of processing resources allocated to the respective processing node).

Data may be collected, for example, by code sensors that monitor the input, and/or processing outcome of the respective processing node. Data may be collected, for example, by observing previous iterations of the method described with reference to FIG. 2. Data may be collected, for example, by generating a set of test processing resources (e.g., according to a selected distribution), feeding the test processing resources to the processing node, and monitoring the processing outcome.

The processing nodes may be of any type, i.e., different types. Processing nodes are not necessarily related to one another, for example, there may be a correlation between nodes, or there may be no correlation between nodes.

At 206, optionally, outliers are removed from the training datasets, optionally per training dataset. The outliers represent records that are far from the rest of the records of the training dataset.

Records of the respective training dataset are partitioned into buckets with internal minimal variance, optionally using a dynamic programming approach. Records that exceed a threshold (e.g., interquartile range (IQR)) within the respective bucket represent outliers, and are removed.

The outlier removal procedure is designed for data distributions where outliers exist in both crowded buckets and sparse buckets (e.g., extremely sparse), for example, trend curves and/or non-uniformly distributed data. The outlier removal procedure described herein is different than other standard approaches (e.g., isolated forest, local outlier factor) that are based on neighborhood which remove most of the points in the sparse regions of the curve.

The number of buckets and the number of points per bucket may be determined simultaneously and/or automatically by a dynamic programming approach, while trying to minimize the sums of the intra bucket variances while regularizing on the number of samples per bucket to be at least 10 (or other number of) samples per bucket (in an exemplary implementation the dynamic programing approach is invoked for minimal number of 100 points or other value may be used).

Exemplary pseudo code for outlier removal is now provided:
1. Run Dynamic programming with the objective function above. Output: set of buckets and association of each sample to the appropriate bucket
2. Run interquartile range (IQR) for each bucket to determine which points are considered outliers within the bucket. Output: list of output candidates
3. If the number of outlier candidates does not exceeds the maximal number of points to remove, then remove all outliers from the dataset
Else:
Sort the outlier candidates by the magnitude of the violation and remove the top of the list that is allowed from the dataset.
Output: dataset with no outliers Reference is now made to FIG. 3, which includes a graph 302A depicting a prediction model 304A and error boundary 306A fitted to points 308A of records of a training dataset without outlier removal and a graph 302B depicting a prediction model 304B and error boundary 306B fitted to points 308B of the records with identified outliers 310 that were removed, in accordance with some embodiments. The outlier removal procedures affect the predicted value and the estimated error as can be verified by comparing graph with outliers 302A and graph without outliers 302B.

Referring now back to FIG. 2, at 208, multiple predictive models are trained.

Each respective predictive model corresponds to a certain processing node.

The respective predictive model is trained on the training dataset created for the certain processing node, for example, by fitting the values of the records of the respective training dataset to a curve defined by the type of the respective predictive model.

Each respective predictive model is implemented as a monotonically increasing function that optionally reaches a saturation level, optionally a step-wise monotonically increasing function. The respective predictive model is a curve fitting model that takes into consideration the diminishing processing return (e.g., decreasing marginal return).

Exemplary types of predictive models include: concave piecewise linear (CPWL) model, isotonic model, and sigmoid model.

Optionally, all of the predictive models for the multiple processing nodes are of a same selected type. Exemplary approaches for selecting the type of predictive model are described, for example, with reference to 202.

Optionally, each predictive model is implemented as a concave piecewise linear model denoting a pointwise maximum of a set of affine functions (over the input). Parameters of the affine functions (e.g., denoted $A_k*X+B_k$) are determined by minimizing a mean square error on the records of the training dataset used to train the respective predictive model.

The concave piecewise linear functions can be considered a concave approximation of the isotonic function (convex hull) described herein.

Computational efficiency of the computing device solving predictive models (also referred to as an optimization phase) implemented as concave piecewise linear functions is improved, by converting an optimization problem into a concave problem, which enables finding the global optimization in polynomial time.

An exemplary approach for using the CPWL model is now provided:

A pre-defined number of affine functions are denoted as $a_k*x\_i+b_k$, where k is chosen to be between (10-20). The sum of squares of the residual error is minimized between the pointwise maximum of the set of affine functions at each point $\{x\_i\}$ and the target variables $\{y\_i\}$ with respect to the affine functions parameters $\{a_k\}, \{b_k\}$.

A constraint is applied on the scales of the affine functions $\{a_k\}$ to be nonnegative since the functions are non-decreasing. The non-decreasing phenomenon is imposed explicitly by requiring that $\max(a_k*x\_i+b\_k)>=\max(a_k*x\_j+b\_k)$ for all $x\_i>=x\_j$.

An optional regularization to the main objective function is to maximize the discrepancy between the scales $\{a_k\}$ of the of different affine functions in order to encourage variability among the affine functions, such that their scales will not collapse to the same values during the optimization, and maintain more expressivity of the CPWL model.

In order to make the optimization more efficient, an ADMM (alternating direction method of multipliers) process may be used. ADMM introduces a slack variable denoted $z\_i=\max(a_k*x\_i+b\_k)$, and apply separate optimization problem for $\{z\_i\}$ and $\{x\_i\}$ which results in fitting an isotonic regression for $\{z\_i\}$ and fitting a CPWL for $\{a_k, b_k\}$ but now against the isotonic regression predictions $\{z\_i\}$, this results in a much more tractable sub-optimization problem for the CPWL since the isotonic function is already non-decreasing one and much less noisy. The ADMM process terminates when both curves converge and there is no sufficient decrease in the sum of squared residuals.

Figure 4:
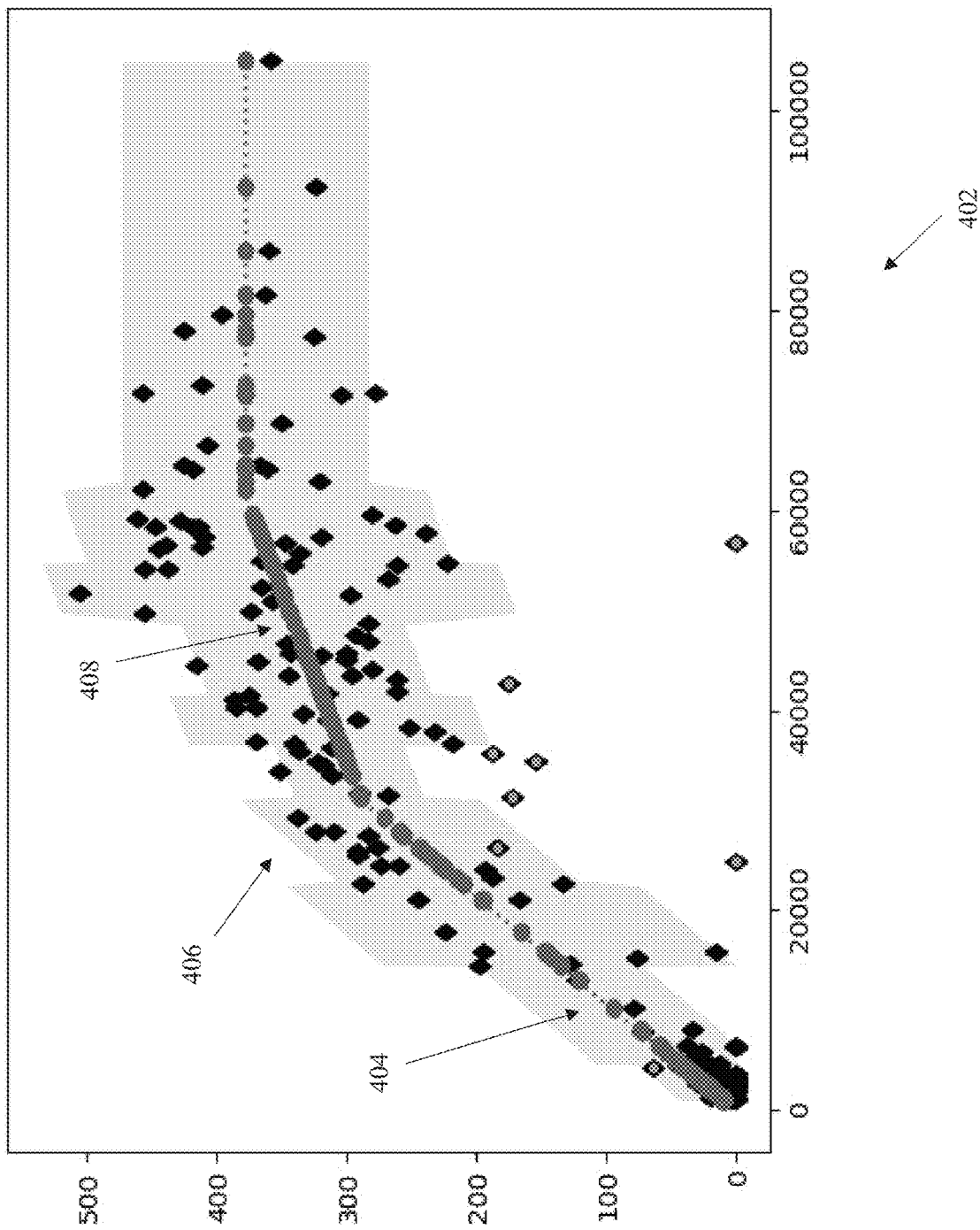
FIG. 4 is a graph depicting an example of a concave piecewise linear model fitted to records of a training dataset, in accordance with some embodiments.

Reference is now made to FIG. 4, which is a graph 402 depicting an example of a concave piecewise linear model 404 fitted to records 406 of a training dataset, in accordance with some embodiments. One linear piece 408 is shown as an example.

Referring now back to FIG. 2, at 208, alternatively, each predictive model is implemented as an isotonic model that includes a non-parametric model. The isotonic model is trained by finding a non-decreasing step-wise approximation of a function while minimizing a mean square error on the records of the respective training dataset. The records of the respective training dataset used to train the respective isotonic predictive model are used to find the optimized partition to steps along an axis indicating the historical amount of processing resources and along an axis indicating the processing outcomes.

Potential advantages of the non-parametric isotonic model is that no specific shape is assumed for the target function besides monotonicity, enabling fitting to different distributions of the records of different training dataset.

Figure 5:
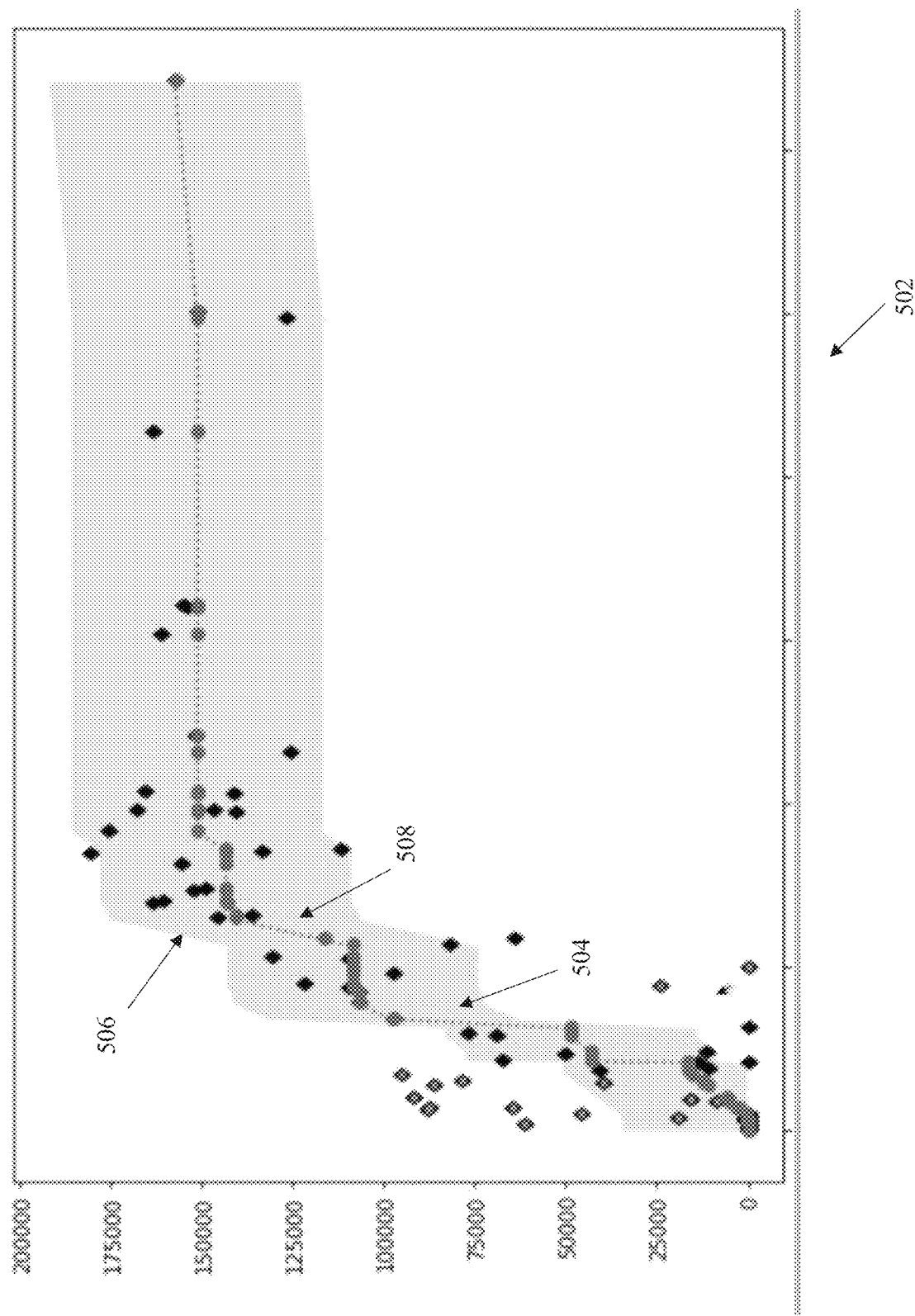
FIG. 5 is a graph depicting an example of an isotonic model fitted to records of a training dataset, in accordance with some embodiments.

Reference is now made to FIG. 5, which is a graph 502 depicting an example of an isotonic model 504 fitted to records 506 of a training dataset, in accordance with some embodiments. The Isotonic model includes multiple steps, where one step 508 is shown as an example. Each step is portioned along the x-axis and has a value along the y-axis.

Referring now back to FIG. 2, at 208, alternatively, each predictive model is implemented as a sigmoid model. The sigmoid model is implemented as multiple parameters of a function (i.e. a parametric function) that minimizes a mean square error on the records of the training dataset of the respective predictive model. The sigmoid model is based on a scaled logistic function capable of achieving values that exceed a range of 1. The sigmoid model may be implemented, for example, as $y_i=f(X_i)=(c/(1+\exp(-a*X_i+b)))$, where $y_i$ denotes the processing outcome, and $X_i$ denotes the amount of allocated processing resources, f denotes the sigmoid model. The sigmoid model is trained to find the model parameters denoted as $\Theta=a, b, c$. The parameters are constrained to obey a zero-crossing constraint denoted $X_i==0 \rightarrow Y_i==0$, if necessary.

Figure 6:
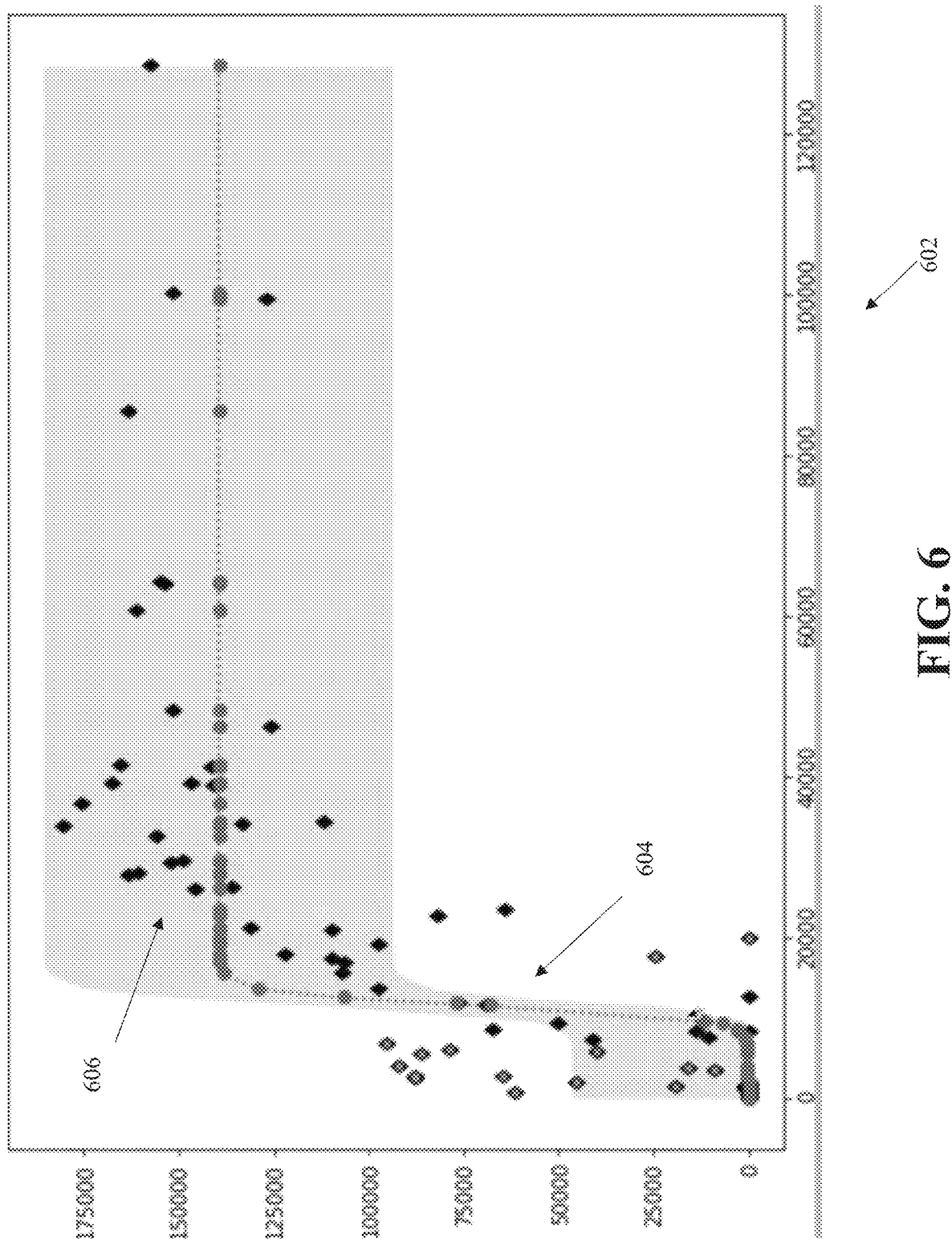
FIG. 6 is a graph depicting an example of a sigmoid model fitted to records of a training dataset, in accordance with some embodiments.

Reference is now made to FIG. 6, which is a graph 602 depicting an example of a sigmoid model 604 fitted to records 606 of a training dataset, in accordance with some embodiments.

Referring now back to FIG. 2, at 210, an uncertainty value indicative of a goodness of fit of the training dataset to the respective predictive model is estimated. The estimating is performed during the training of the predictive models. The estimating may be performed, for example, using a mean square error (MSE) metric on the records of the training dataset.

The uncertainty value may be a non-uniform uncertainty value, computed for each one of multiple buckets of the records of the training dataset. The records of the training dataset are divided into multiple buckets with internal minimal variance of a prediction error. The division into buckets may be implemented for example, using a dynamic programming approach. Each bucket denotes an amount of error (i.e., uncertainty), for example, 2 standard deviations of the records within the respective bucket.

Optionally, the uncertainty value is computed when there are a sufficient number of records, for example, above a threshold.

Correct capture of the errors (uncertainty) within each bucket may be verified.

Figure 7:
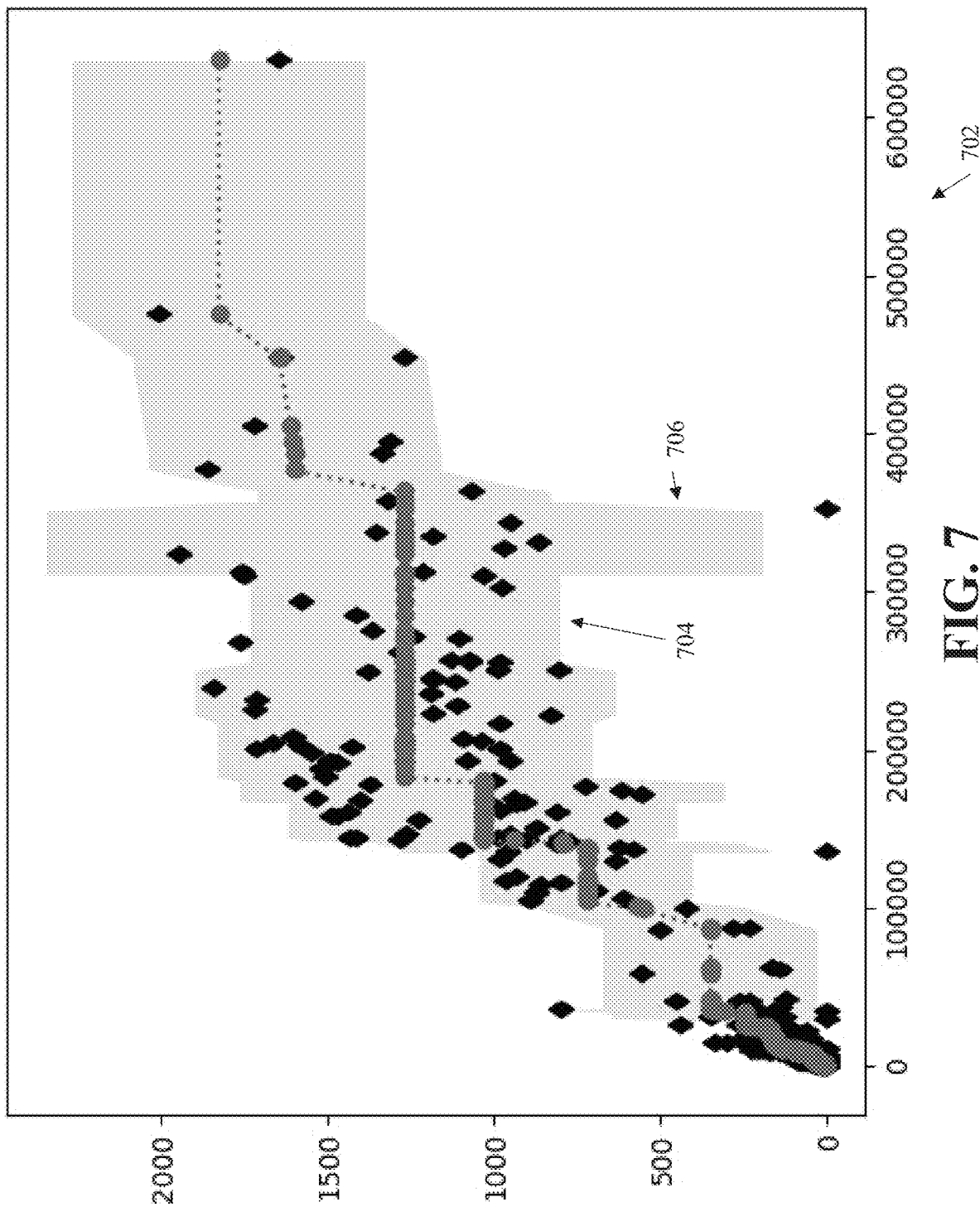
FIG. 7 is a graph depicting non-uniform uncertainty values computed for different sized buckets, in accordance with some embodiments.

Reference is now made to FIG. 7, which is a graph 702 depicting non-uniform uncertainty values computed for different sized buckets, in accordance with some embodiments.

As seen in graph 702, the width along the x-axis, and a 2-sigma value along the y-axis, is non-uniform, different for each bucket. The error is non-uniform along the y-axis and varies by width along the x-axis in order to capture regions with homogenous errors. For example, bucket 704 and 706 have different dimensions along the x-axis and along the y-axis.

At 212, the optimization problem is solved using the trained predictive models, to identify a respective amount of processing resources for allocation to each processing node that maximizes total processing outcomes for a predetermined total amount of processing resources.

The solution to the optimization problem may be represented by a set of points along the curves defining the trained predictive models.

The approach to solving (i.e., optimizing) the trained predictive models is according to the type of predictive model, for example, as described with reference to 208. Each approach is designed to exploit the unique properties of the respective predictive model, enabling efficient optimization, i.e., efficient use of processing resources and/or memory of the computing device computing the solution.

Constraints are used as part of the optimization function that is used according to the prediction model type.

For all three types of predictive models (i.e., CPWL, isotonic, sigmoid), bound constraints including upper bounds and/or lower bounds per processing node may be handled as part of the optimization problem under constraints (Lagrangian is for the sigmoid).

For predictive models of the sigmoid type, the constrained optimization problem is solved using the augmented Lagrangian approach.

When the predictive models are implemented as concave piecewise linear models, the concave piecewise linear models may be solved to obtain a global maxima. The optimization problem is a concave problem which may be solved to obtain global maxima in polynomial time. The concave piecewise linear models are rewritten in terms of an epigraph of a function where a maximum function is reformulated as a set of linear inequality constraints providing an augmentation of variables representing a maximal value that is reachable by each function.

When one or more of the following conditions is met, the concave piecewise linear models may be solved using a linear programming solver, which is computationally efficient (e.g., in terms of using reduced processing resource and/or reduced memory): a set of linear objective constraints is used, linear equality constrains and used, and inequality constraints are used.

The approach described herein for solving concave piecewise linear models improves computational efficiency of the computing device computing the solution, for example, in terms of using reduced processing resource and/or reduced memory. The improvement in computational efficiency may be in comparison to other optimization approaches. The improvement in computational efficiency may be obtained based on the problem over concave piecewise linear functions being a convex optimization problem. A global optimum can be obtained efficiently in polynomial time, contradictory to the other approaches which are combinatorial in nature and therefore are NP-complete, which reduces computational efficiency, requiring higher processing resource utilization and/or additional memory to reach a global optimum.

When the predictive models are implemented as isotonic models, the isotonic models may be formulated as a mixed integer linear programming (MILP) problem. The isotonic models are recast using indicator functions representing whether the processing resources allocated to a specific processing node falls within a certain bucket of the isotonic model or not. The isotonic curves become a sum of indicator variables multiplied by a level of the certain bucket. Constraints of the processing resources for allocation are reformulated using the indicator functions. When indicator functions are Boolean, constrains are linear, and an objective function indicating maximization of the total amount of processing is linear, enabling use of the mixed integer linear programming regime, which improves computational efficiency, efficiency use of processing resources, and/or efficiency memory usage, in the computing device computing the solution.

The MILP method may be used to optimize for the isotonic curve, for example, since each isotonic curve can be recast as a sum of indicator functions multiplied by the value assigned to each bucket. The indicator functions may be Boolean variables and/or the function is linear in those variables. There are also linear constraints involving those indicator variables to fit with the resource allocation constraints since the actual portion assigned to each curve is given by the indicator function of the relevant bucket within the curve, multiplied by its associated boundary value. Accordingly, the problem fits the MILP regime.

The MILP is an efficient method that can solve combinatorial problems very fast and with good solutions but global maximization is not guaranteed. The MILP may be implemented, for example, as a library in the Python language, that applies branch and cut methods for these types of problems, or using other implementations.

When the predictive models are implemented as sigmoid models, the sigmoid models may be solved based on an augmented Lagrangian approach, in which bound constraints such as per node upper and lower bounds are handled through projected gradient steps, while the global constraints are handled through the augmented Lagrangian scheme.

Figure 8:
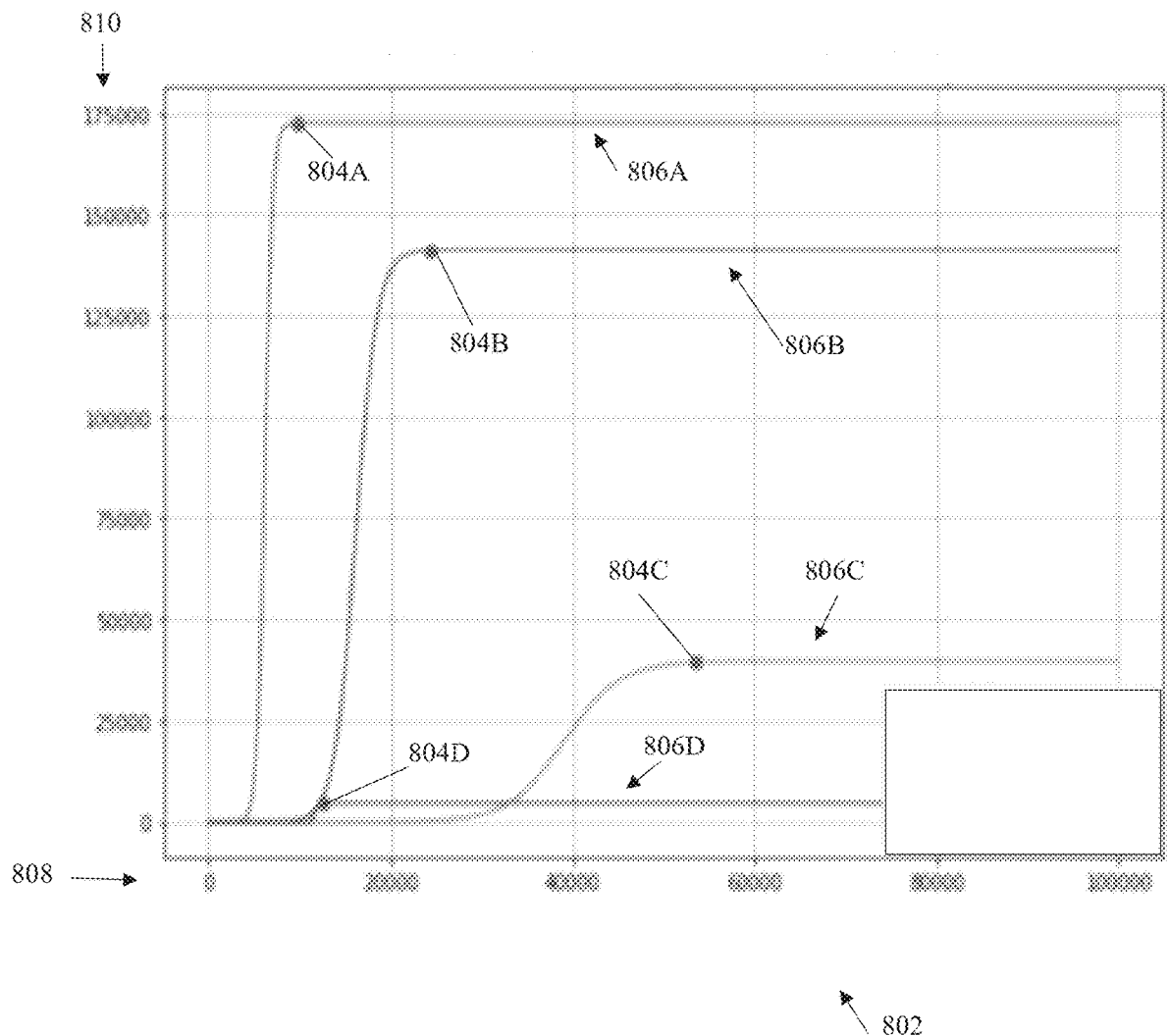
FIG. 8 a graph depicting a solution to predictive models implemented as sigmoid curves, in accordance with some embodiments.

Reference is now made to FIG. 8, which a graph 802 depicting a solution 804A-D to predictive models 806A-D implemented as sigmoid models, in accordance with some embodiments. Each respective predictive model 806A-D represents a respective processing node. I.e., four predictive models correspond to 4 processing nodes. Each respective solution 804A-D represents a respective optimal amount of processing resources obtained by dividing a predetermined total amount of processing resources. The respective optimal amount of processing resources is denoted by the corresponding value along the x-axis 808. A respective processing outcome is obtained, as denoted by the corresponding value along the y-axis 810, when the respective optimal amount of processing resources is provided to the respective processing node. The solution 804A-D is designed to maximize the sum of the processing outcomes for the four processing nodes when the predetermined total amount of processing resources is divided and allocated to the four processing nodes.

Figure 9:
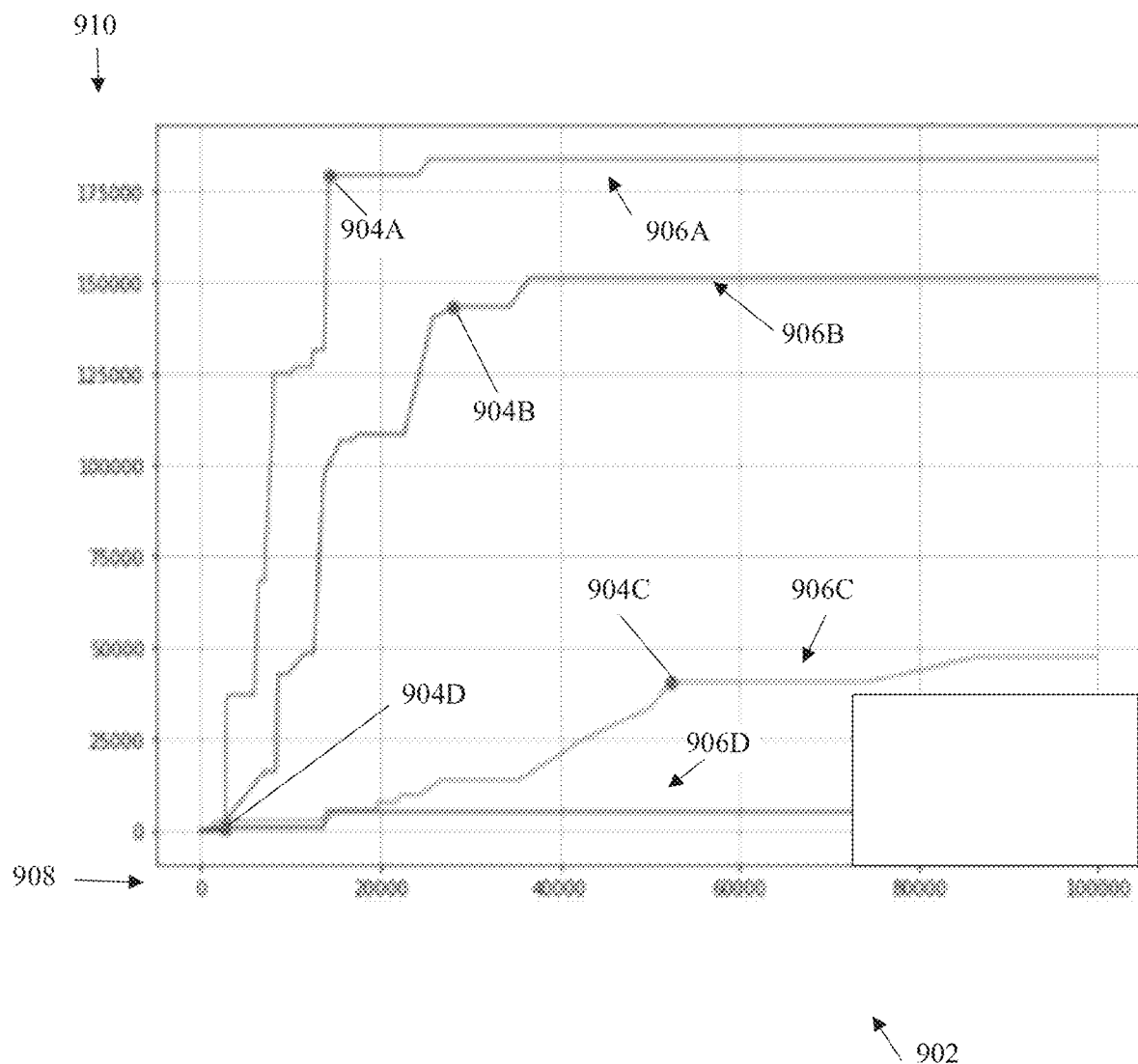
FIG. 9 is a graph depicting a solution to predictive models implemented as concave piecewise linear models, in accordance with some embodiments.

Reference is now made to FIG. 9, which is a graph 902 depicting a solution 904A-D to predictive models 906A-D implemented as isotonic models, as seen by the step-wise nature of graphs 906A-D, in accordance with some embodiments. Isotonic models 906A-D of FIG. 9 and sigmoid models 806A-D of FIG. 8 are trained using different implementations of the predictive models, using data from the same training datasets obtained from the same processing nodes, and using the global constraint for the predetermined total amount of processing resources (e.g., maximum value, range).

The respective optimal amount of processing resources is denoted by the corresponding value along the x-axis 908. A respective processing outcome is obtained, as denoted by the corresponding value along the y-axis 910, when the respective optimal amount of processing resources is provided to the respective processing node. The solution 904A-D is designed to maximize the sum of the processing outcome for the four processing nodes when the predetermined total amount of processing resources is divided and allocated to the four processing nodes.

In a comparison between graph 802 of FIG. 8 and graph 902 of FIG. 9, it is visually apparent that there is a difference in the division of the predetermined amount of processing resources (under the same global constraint) into the amount of processing resources allocated to each processing node (which are the same in both graphs 802 and 902).

Moreover, the comparison between graph 802 of FIG. 8 and graph 902 of FIG. 9 illustrates that there is a different in the amount of predicted optimal processing outcomes for the predetermined amount of processing resources by the same processing nodes. Both cases, depicted in FIG. 8 and FIG. 9, have a total amount of processing resources to allocate of 10,000 for which processing outcome is maximized using the respective predictive model type. When sigmoid models (FIG. 8) are used for prediction and an adequate optimization function (augmented Lagrangian) is used, the processing outcome is 358257.43, while using almost all the 10,000 amount of processing resources (actually 99996). When the isotonic models (FIG. 9) are used, the optimization function (MILP) generates a predicted processing outcome of 364446.44. In this case, due to the saturation behavior of the isotonic models (reaching flat values), not all the possible amount of allocated processing resources are consumed, 97150<10,000, because using all the allocated processing resources would not increase at all the predicted processing outcomes.

The solution depicted in graph 902 is better than the solution depicted in graph 802 of FIG. 8. The improvement may be due to the step-wise monotonically increasing nature of the isotonic model. The solution depicted in graph 902 obtained a higher total amount of processing outcome for a smaller total amount of processing resources, in comparison to the solution depicted in graph 802 of FIG. 8. The smaller amount of processing resources, i.e., 97150, is below the possibly allocated amount of 10,000, because in the case of the isotonic model, the graphs/models reach real saturation. When saturation is reached, the graph is flat, so there is no advantage in allocating all the processing resources possible, and no additional return is achieved.

Referring now back to FIG. 2, at 214, a prediction of the total processing outcome of the predetermined total amount of processing resources may be computed. The prediction may be made by feeding an indication of each respective amount of processing resources for allocation to each respective corresponding predictive model. An indication of a respective predicted amount of processing outcome for the respective amount of processing resources for allocation to the respective corresponding processing node, is obtained from each respective prediction model. A sum of the processing outcomes for the processing resources obtained by the processing nodes may be computed, or another predicted processing outcome may be computed as defined by set constraint.

The prediction of processing outcome may be evaluated, for example, to determine whether to proceed to perform the allocation of processing resources, or whether changes to one or more parameters defined in feature 202 of FIG. 2 are to be adapted in an attempt to obtain a different predicted processing outcome (e.g., increase the predicted processing outcome). Examples of adaptations to the parameters performed in 202 include selecting a different type of predictive model, and/or adapting values of the local and/or global constraints. Features of the method may be iterated, and parameters adapted in 202, for example, as described with reference to 220 of FIG. 2.

Referring now back to FIG. 8 and FIG. 9, solutions 804A-D of predictive models 806-D and solutions 904A-D of predictive models 906A-D may be used to predict the total processing outcome when the predetermined total amount of processing resources is divided and allocated to each respective processing node according to solutions 804A-D and a respective processing outcomes is obtained by each respective processing node. For example, the sum of processing outcomes predicted to be obtained for each respective processing node for the respective allocated processing resources portion of the predetermined total amount of processing resources. The sigmoid models of FIG. 8 are predicted to generate a processing outcome of 358257.43 for a predetermined total amount of processing resources of 99996, and the isotonic models of FIG. 9 are predicted to generate a processing outcome of 364446.44 for a predetermined total amount of processing resources of 97150.

At 216, instructions for allocation of the respective amount of processing resources to each respective processing node are generated using the solution to the optimization function, performed over the predictive models. Instructions may be implemented, for example, as code for execution by the computing device (e.g., for automatic allocation of the processing resources), and/or as instructions for manual implementation by a user. Instructions for manual implementation may be, for example, text, images, video, and/or animation, which may be presented on a display, played as audio, and/or sent as a message such as to an email, indicating to the user the amount of processing resources to allocate to which node. For example, allocate 10 CPUs to node A, and allocate 5 CPUs to node B.

At 218, each respective amount of processing resources is allocated to each respective processing node according to the generated instructions. For example, the computing device automatically allocates the processing resources to the processing nodes, and/or a user manually allocates the processing resources to the processing nodes.

At 220, one or more features described with reference to 202-218 may be iterated. For example, iterations may be performed to evaluate the performance of the allocation, perform new allocations, and/or adapt parameters of the current allocation in an attempt to improve processing outcomes.

Optionally, the actual processing of each allocated amount of processing resources is measured by each respective processing node. The actual processing outcome may be measured, and fed back by each respective processing node, for updating the training dataset. The training dataset may be updated with an indication of the actual allocated processing resources and corresponding actual processing outcomes that were obtained, which may serve as ground truth. The predictive models may be updated with the updated training dataset. Subsequent allocations may be done using the updated predictive models.

Figure 10:
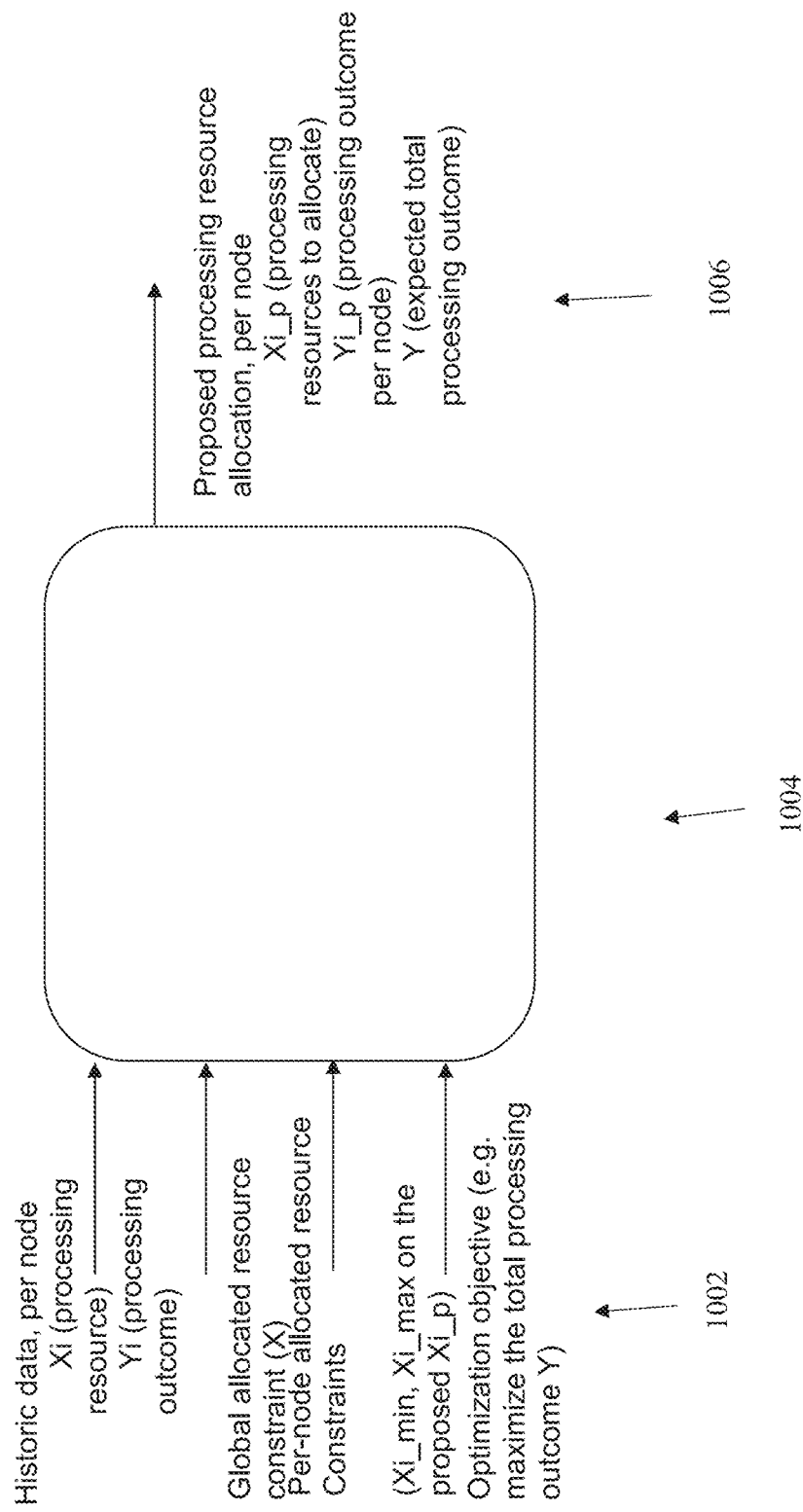
FIG. 10 is a high level dataflow diagram depicting an exemplary dataflow for allocating processing resources for processing by multiple processing nodes exhibiting diminishing processing outcomes, in accordance with some embodiments.

Reference is now made to FIG. 10, which is a high level dataflow diagram depicting an exemplary dataflow for allocating processing resources to multiple processing nodes exhibiting diminishing returns of processing outcomes, in accordance with some embodiments. The high level dataflow may be implemented, for example, by components of system 100 described with reference to FIG. 1, and/or by features of the method described with reference to FIG. 2. Exemplary inputs 1002 include one or more of: historic allocated processing resources (i.e., node) and corresponding processing outcome per processing node (e.g., used to generate the training datasets, as described with reference to 204 of FIG. 2), and global processing resources constraints, per node processing resources constraints, and the optimization objective (e.g., as described with reference to 202 of FIG. 2). The inputs are processed 1004, for example, as described with reference to 206-214 of FIG. 2. A proposed processing resources allocation per processing node is provided as an outcome 1006, for example, as described with reference to 216 of FIG. 2.

In terms of mathematical representation:

The processing node is denoted i.

The processing resources allocated to node i, are denoted $X_i$.

The processing outcome of the processing node, for example, amount of images/text processed, amount of computations performed, is denoted $Y_i$. The global constraint of a sum of per-node allocated processing resources may be limited to a value denoted X, such that sum $(X_i) <= X$.

The trained prediction model may be denoted as $Y_i = f(X_i, \Theta)$, where $X_i$ is the historic per node allocated processing resources, $Y_i$ is the historic processing outcome of the processing node (which are included in the training dataset), f denotes the predictive model, and $\Theta$ denote parameters of the predictive model.

The objective function may be defined as maximize the total processing outcome from all nodes denoted as: max{sum{$Y_i\_p$}}.

The proposed amount of processing resources to allocate to a certain processing node denoted i, is denoted $X_i\_p$. The corresponding predicted processing outcome by the processing node in response to the allocated amount of processing resources is denoted as $Y_i\_p$ per processing node denoted i.

The per-node constraints on $X_i\_p$, are to be within a range of values denoted [$X_i\_min$, $X_i\_max$]. The global constraint is over the sum ($X_i$). The processing resources allocate proposed, $X_i\_p$, obeys the constraint of sum ($X_i\_p$) X=X.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant codes and processing nodes will be developed and the scope of the terms code and processing node are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A computer implemented method of allocating processing resources for processing by a plurality of processing nodes, comprising:
    training a plurality of predictive models, each predictive model for a respective processing node of the plurality of processing nodes, each predictive model trained on a training dataset comprising a plurality of records, each record including a historical amount of processing resources allocated to the respective processing node and a ground truth label indicating historical processing outcomes,
    wherein each processing node of the plurality of processing nodes exhibits diminishing returns of processing outcomes with increasing allocated processing resources,
    wherein each predictive model is implemented as a monotonically increasing function that reaches a saturation level,
    solving an optimization allocation problem using the plurality of predictive models to identify a plurality of respective amounts of processing resources for allocation to each respective processing node of the plurality of processing nodes that maximizes a total of processing outcomes for a predetermined total amount of processing resources; and
    generating instructions for allocation of the plurality of respective amounts of processing resources to each respective processing node of the plurality of processing nodes.

2. The computer implemented method of claim 1, further comprising: for each training dataset:
    partitioning the plurality of records into buckets with internal minimal variance using a dynamic programming approach; and
    for each bucket, removing records that exceed a threshold.

3. The computer implemented method of claim 1, wherein each predictive model is implemented as a concave piecewise linear model (CPWL) denoting a pointwise maximum of a set of affine functions, wherein parameters of the affine functions are determined by minimizing a mean square error on the plurality of records of the training dataset of the respective predictive model.

4. The computer implemented method of claim 3, wherein solving the plurality of predictive models comprises solving a plurality of concave piecewise linear models to obtain a global maxima, wherein the plurality of concave piecewise linear models are rewritten in terms of an epigraph of a function where a maximum function is reformulated as a set of linear inequality constraints providing an augmentation of variables representing a maximal value that is reachable by each function.

5. The computer implemented method of claim 4, wherein given at least one of: (i) a set of linear objective constraints, (ii) linear equality constrains, and (iii) inequality constraints, the plurality of concave piecewise linear models are solved using a linear programming solver.

6. The computer implemented method of claim 1, wherein each predictive model is implemented as an isotonic model comprising a non-parametric model.

7. The computer implemented method of claim 6, wherein training the isotonic model comprises finding a non-decreasing step-wise approximation of a function while minimizing a mean square error on the plurality of records of the training dataset of the respective predictive model.

8. The computer implemented method of claim 6, wherein the plurality of records of the training dataset of the respective predictive model are used to find partitions to steps along an axis indicating the historical amount of processing resources and along an axis indicating the processing outcomes.

9. The computer implemented method of claim 6, wherein solving the plurality of predictive models comprises solving a plurality of isotonic models as a mixed integer linear programming (MILP) problem, wherein the plurality of isotonic models are recast using indicator functions representing whether the processing resources allocated to a specific processing node falls within a certain bucket of the isotonic model or not.

10. The computer implemented method of claim 9, wherein the plurality of isotonic models become a sum of indicator variables multiplied by a level of the certain bucket, wherein constraints of the processing resources for allocation are reformulated using the indicator functions, and wherein the indicator functions are Boolean, constrains are linear, and an objective function indicating maximization of the total processing outcome is linear.

11. The computer implemented method of claim 1, wherein each predictive model is implemented as a sigmoid model comprising a plurality of parameters of a function that minimizes a mean square error on the plurality of records of the training dataset of the respective predictive model, wherein the sigmoid model is based on a scaled logistic function capable of achieving values that exceed a range of 1.

12. The computer implemented method of claim 11, wherein training the sigmoid model comprises finding the plurality of parameters by constraining the plurality of parameters to obey a zero-crossing constraint.

13. The computer implemented method of claim 11, wherein solving the plurality of predictive models comprises solving a plurality of sigmoid models based on an augmented Lagrangian approach.

14. The computer implemented method of claim 1, wherein at least one of: (i) bound constraints including upper bounds and/or lower bounds per processing node are handled using projected gradient steps, and (ii) global constraints are handled using an augmented Lagrangian approach.

15. The computer implemented method of claim 1, further comprising:
during the training the plurality of predictive models, estimating an uncertainty value indicative of a goodness of fit of the training dataset to the respective predictive model using a mean square error (MSE) metric on the records of the training dataset;
dividing the records of the training dataset into a plurality of buckets with internal minimal variance of a prediction error using a dynamic programming approach, and computing a non-uniform uncertainty value for the plurality of buckets.

16. The computer implemented method of claim 1, further comprising computing a prediction of the total processing outcomes for the predetermined total amount of processing resources by feeding an indication of each respective amount of processing resources for allocation to each respective corresponding predictive model, obtaining an indication of a respective predicted processing outcome of the respective amount of processing resources for allocation to the respective corresponding processing node, and computing a sum of the amounts of processing outcomes for the amounts of processing resources by the plurality of processing nodes.

17. The computer implemented method of claim 1, wherein at least one of: the predetermined total amount of processing resources is constrained by a global constraint, and the amount of processing resources for allocation to each respective processing node is constraint by a respective local constraint.

18. The computer implemented method of claim 1, wherein the processing resources for allocation comprises content for allocation, the plurality of processing nodes comprises a plurality of content platform nodes, and the processing outcome for each respective content platform node is in response to an interaction of at least one user with the content allocated to the respective content platform node.

19. A device for allocating processing resources for processing by a plurality of processing nodes, comprising:
at least one processor executing a code for:
training a plurality of predictive models, each predictive model for a respective processing node of the plurality of processing nodes, each predictive model trained on a training dataset comprising a plurality of records, each record including a historical amount of processing resources allocated to the respective processing node and a ground truth label indicating historical processing outcomes,
wherein each processing node of the plurality of processing nodes exhibits diminishing returns of processing outcomes with increasing allocated processing resources,
wherein each predictive model is implemented as a monotonically increasing function that reaches a saturation level,
solving an optimization allocation problem using the plurality of predictive models to identify a plurality of respective amounts of processing resources for allocation to each respective processing node of the plurality of processing nodes that maximizes a total of processing outcomes for a predetermined total amount of processing resources; and
generating instructions for allocation of the plurality of respective amounts of processing resources to each respective processing node of the plurality of processing nodes.

20. A non-transitory medium storing program instructions for allocating processing resources for processing by a plurality of processing nodes, which, when executed by a processor, cause the processor to:
train a plurality of predictive models, each predictive model for a respective processing node of the plurality of processing nodes, each predictive model trained on a training dataset comprising a plurality of records, each record including a historical amount of processing resources allocated to the respective processing node and a ground truth label indicating historical processing outcomes, wherein each processing node of the plurality of processing nodes exhibits diminishing returns of processing outcomes with increasing allocated processing resources, wherein each predictive model is implemented as a monotonically increasing function that reaches a saturation level, solve an optimization allocation problem using the plurality of predictive models to identify a plurality of respective amounts of processing resources for allocation to each respective processing node of the plurality of processing nodes that maximizes a total of processing outcomes for a predetermined total amount of processing resources; and generate instructions for allocation of the plurality of respective amounts of processing resources to each respective processing node of the plurality of processing nodes.

* * * * *